US011712799B2

(12) United States Patent
Cabi et al.

(10) Patent No.: US 11,712,799 B2
(45) Date of Patent: Aug. 1, 2023

(54) DATA-DRIVEN ROBOT CONTROL (71) Applicant: DeepMind Technologies Limited, London (GB)

(72) Inventors: Serkan Cabi, London (GB); Ziyu Wang, St. Albans (GB); Alexander Novikov, London (GB); Ksenia Konyushkova, London (GB); Sergio Gomez Colmenarejo, London (GB); Scott Ellison Reed, New York, NY (US); Misha Man Ray Denil, London (GB); Jonathan Karl Scholz, London (GB); Oleg O. Sushkov, London (GB); Rae Chan Jeong, London (GB); David Barker, Reading (GB); David Budden, London (GB); Mel Vecerik, London (GB); Yusuf Aytar, London (GB); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 147 days.

(21) Appl. No.: 17/020,294

(22) Filed: Sep. 14, 2020

(65) Prior Publication Data
US 2021/0078169 A1    Mar. 18, 2021

Related U.S. Application Data (60) Provisional application No. 62/900,407, filed on Sep. 13, 2019.

(51) Int. Cl.
B25J 9/16 (2006.01)
(52) U.S. Cl.
CPC ............ *B25J 9/161* (2013.01); *B25J 9/163* (2013.01); *B25J 9/1661* (2013.01)

(58) Field of Classification Search
CPC .......... B25J 9/161; B25J 9/163; B25J 9/1661; G06N 3/006; G06N 3/08; G06N 3/0427
See application file for complete search history.

(56) References Cited

U.S. PATENT DOCUMENTS

| 10,766,136 B1* | 9/2020 | Porter ...................... G06N 3/04 |
| 2019/0047149 A1* | 2/2019 | Wouhaybi ............ G06N 3/0454 |

(Continued)

OTHER PUBLICATIONS

Max Jaderberg, Volodymyr Mnih, Wojciech Marian Czarnecki, Tom Schaul, Joel Z Leibo, David Silver, Koray Kavukcuoglu; "Reinforcement Learning with Unsupervised Auxiliary Tasks"; Nov. 16, 2016, arXiv:1611.05397 (Year: 2016).*

(Continued)

*Primary Examiner* — Abby Y Lin
*Assistant Examiner* — Danielle Marie Jackson
(74) *Attorney, Agent, or Firm* — Fish & Richardson P.C.

(57) ABSTRACT

Methods, systems, and apparatus, including computer programs encoded on computer storage media, for data-driven robotic control. One of the methods includes maintaining robot experience data; obtaining annotation data; training, on the annotation data, a reward model; generating task-specific training data for the particular task, comprising, for each experience in a second subset of the experiences in the robot experience data: processing the observation in the experience using the trained reward model to generate a reward prediction, and associating the reward prediction with the experience; and training a policy neural network on the task-specific training data for the particular task, wherein the policy neural network is configured to receive a network input comprising an observation and to generate a policy output that defines a control policy for a robot performing the particular task.

20 Claims, 4 Drawing Sheets

(56) References Cited

U.S. PATENT DOCUMENTS

| | | | |
|---|---|---|---|
| 2019/0061147 A1* | 2/2019 | Luciw | G06N 3/008 |
| 2019/0272477 A1* | 9/2019 | Ide | G06F 3/0481 |
| 2020/0039064 A1* | 2/2020 | McKinley | B25J 9/126 |
| 2020/0175406 A1* | 6/2020 | Song | G06N 20/00 |
| 2021/0073833 A1* | 3/2021 | Manco | B33Y 50/00 |
| 2021/0308863 A1* | 10/2021 | Liu | B25J 9/1664 |
| 2022/0032450 A1* | 2/2022 | Kim | G05B 13/0265 |

OTHER PUBLICATIONS

Abadi et al., "Tensorflow: A system for large-scale machine learning," 12th USENIX Symposium on Operating Systems Design and Implementation, 2016, pp. 265-283.

Akrour et al., "APRIL: Active preference learning-based reinforcement learning," European Conference on Machine Learning and Knowledge Discovery in Databases, 2012, pp. 116-131.

Akrour et al., "Programming by feedback," 31st International Conference on Machine Learning, 2014, 9 pages.

Andrychowicz et al., "Learning dexterous in-hand manipulation," The International Journal of Robotics Research, Nov. 2019, 18 pages.

Ba et al., "Layer normalization," CoRR, Jul. 2016, arxiv.org/abs/1607.06450, 14 pages.

Bajcsy et al., "Learning robot objectives from physical human interaction," Proceedings of Machine Learning Research, 2017, pp. 217-226.

Barth-Maron et al., "Distributed distributional deterministic policy gradients," CoRR, Apr. 2018, arxiv.org/abs/1804.08617, 16 pages.

Bellemare et al., "A distributional perspective on reinforcement learning," CoRR, Jul. 2017, arXiv:1707.06887, 19 pages.

Brochu et al., "A Bayesian interactive optimization approach to procedural animation design," SIGGRAPH Symposium on Computer Animation, 2010, pp. 103-112.

Brochu et al., "Active preference learning with discrete choice data," Advances in Neural Information Processing Systems20, 2007, 8 pages.

Cabi et al., "Scaling data-driven robotics with reward sketching and batch reinforcement learning," CoRR, Sep. 2019, arxiv.org/abs/1909.12200, 11 pages.

Christiano et al., "Deep reinforcement learning from human preferences," Advances in Neural Information Processing Systems 30, 2017, pp. 4299-4307.

Chu et al., "Preference learning with Gaussian processes," 22nd International Conference on Machine Learning, Aug. 2005, pp. 137-144.

Dulac-Arnold et al., "Challenges of real-world reinforcement learning," CoRR, Apr. 2019, arxiv.org/abs/1904.12901, 13 pages.

Feinberg et al., "Log-linear representation for paired and multiple comparison models," Biometrika, 1976, 63(2):245-254.

Griffith et al., "Policy shaping: Integrating human feedback with reinforcement learning," Advances in Neural Information Processing Systems 26, 2013, 9 pages.

Hunter et al., "Matplotlib: A 2d graphics environment," Computing in science & engineering, May 2007, 9(3):90-95.

Ibarz et al., "Reward learning from human preferences and demonstrations in Atari," Advances in Neural Information Processing Systems 31, 2018, pp. 8011-8023.

Jain et al., "Learning preferences for manipulation tasks from online coactive feedback," International Journal of Robotics Research, May 2015, pp. 1296-1313.

Joachims et al., "Evaluating the accuracy of implicit feedback from clicks and query reformulations in web search," ACM Transactions on Information Systems, Apr. 2007, 25(2):7 pages.

Kalashnikov et al., "Scalable deep reinforcement learning for vision-based robotic manipulation," 2nd Conference on Robot Learning, 2018, 87:651673.

Kapturowski et al., "Recurrent experience replay in distributed reinforcement learning," ICLR, 2019, 19 pages.

Karlsson et al., "Autonomous interpretation of demonstrations for modification of dynamical movement primitives," 2017 IEEE International Conference on Robotics & Automation, May 2017, 6 pages.

Koyama et al., "Sequential line search for efficient visual design optimization by crowds," ACM Transactions on Graphics, Jul. 2017,36(4):1-11.

Lange, "Batch reinforcement learning. In Reinforcement learning," Reinforcement Learning, 2012, 28 pages.

Levine et al., "End-to-end training of deep visuomotor policies," Journal of Machine Learning Research, Jan. 2016, 17(1):1-15.

Lillicrap et al., "Continuous control with deep reinforcement learning," CoRR, Sep. 2015, arxiv.org/abs/1509.02971, 14 pages.

Losey et al., "Including uncertainty when learning from human corrections," Conference on Robot Learning, Sep. 2018, 10 pages.

McKinney et al., "Data structures for statistical computing in python," Proceedings of the 9th Python in Science Conference, 2010, pp. 51-56.

Mosteller, "Remarks on the method of paired comparisons: I. the least squares solution assuming equal standard deviations and equal correlations," Psychometricka, 1951, 16:3-9.

Ng et al., "Algorithms for inverse reinforcement learning," International Conference on Machine Learning, Jun. 2010, 1(2):663-670.

Quigley et al., "Ros: an open-source robot operating system," ICRA Workshop on Open Source Software, May 2009, 6 pages.

Sermanet et al., "Unsupervised perceptual rewards for imitation learning," CoRR, Dec. 2016, arxiv.org/abs/1612.06699, 15 pages.

Silver et al., "Deterministic policy gradient algorithms," 31st International Conference on Machine Learning, 2014, 9 pages.

Stern, "A continuum of paired comparison models," Biometrika, Jun. 1990, 77(2):265-273.

Strens et al., "Policy search using paired comparisons," Journal of Machine Learning Research, Dec. 2002, 3:921-950.

Subramanian et al., "Exploration from demonstration for interactive reinforcement learning," 15th International Conference on Autonomous Agents & Multiagent Systems, May 2016, 10 pages.

Thurstone, "A law of comparative judgement," Psychological Review, 1927, 34(4):273-286.

Werbos et al., "Backpropagation through time: what it does and how to do it," Proceedings of the IEEE, Oct. 1990, 78(10):1550-1560.

Wirth et al., "A survey of preference-based reinforcement learning methods," Journal of Machine Learning Research, Jan. 2017, 18(1):1-46.

Zenodo.org [Online] "mwaskom/seaborn: v0.8.1," Sep. 3, 2017, retrieved on Nov. 20, 2020, retrieved from URL<https://zenodo.org/record/883859#.X7gSau-Sk2x>, 5 pages.

Agarwal et al., "Learning to Generalize from Sparse and Underspecified Rewards," Proceedings of the 36th International Conference on Machine Learning, 2019, 97:130-140.

Cabi et al., "A Framework for Data-Driven Robotics," CoRR, Sep. 2019, arxiv.org/abs/1909.12200, 9 pages.

Jun et al., "Goal-Driven Navigation for Non-holonomic Multi-Robot System by Learning Collision," 2019 international Conference on Robotics and Automation, May 2019, pp. 1758-1764.

PCT International Search Report and Written Opinion in International Appln. No. PCT/EP2020/075609, dated Feb. 2, 2021, 22 pages.

Silverio et al., "Learning Task Priorities from Demonstrations," IEEE Transactions on Robotics, Feb. 2019, 35(1):78-94.

International Preliminary Report on Patentability in International Appln. No. PCT/EP2020/075609, dated Mar. 24, 2022, 15 pages.

\* cited by examiner

DATA-DRIVEN ROBOT CONTROL

CROSS REFERENCE TO RELATED APPLICATIONS

This application claims priority to U.S. Provisional Application No. 62/900,407, filed on Sep. 13, 2019. The disclosures of the prior applications are considered part of and are incorporated by reference in the disclosure of this application.

BACKGROUND

This specification relates to controlling robots using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of weights.

SUMMARY

This specification describes a system implemented as computer programs on one or more computers in one or more locations that trains a policy neural network that is used to control a robot, i.e., to select actions to be performed by the robot while the robot is interacting with an environment, in order to cause the robot to perform a particular task.

Particular embodiments of the subject matter described in this specification can be implemented so as to realize one or more of the following advantages.

The techniques described in this specification allow a system to repurpose past experiences for learning a new task. In particular, starting from a limited number of annotated experiences, the system can generate a large amount of training data and then train a policy neural network for the new task entirely off-line. This limits additional wear and tear on the physical robot because no additional robot interaction is required once the limited number of annotated experiences have been generated. Moreover, this approach is robust and does not require a manually-engineered reward for new tasks.

More specifically, the robot experience data (also referred to as never ending storage or NES) contains camera and sensor data that was recorded by a robot and accumulates as the robot (or more than one robot) learns and solves new tasks. The system can use this accumulated data to train a neural network to control a robot for a new task using only minimal demonstration data of the robot or of another agent performing the new task and without needing additional robot interaction with the environment. This results in a control policy for the robot for the new task that is robust and allows the robot effectively perform the new task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
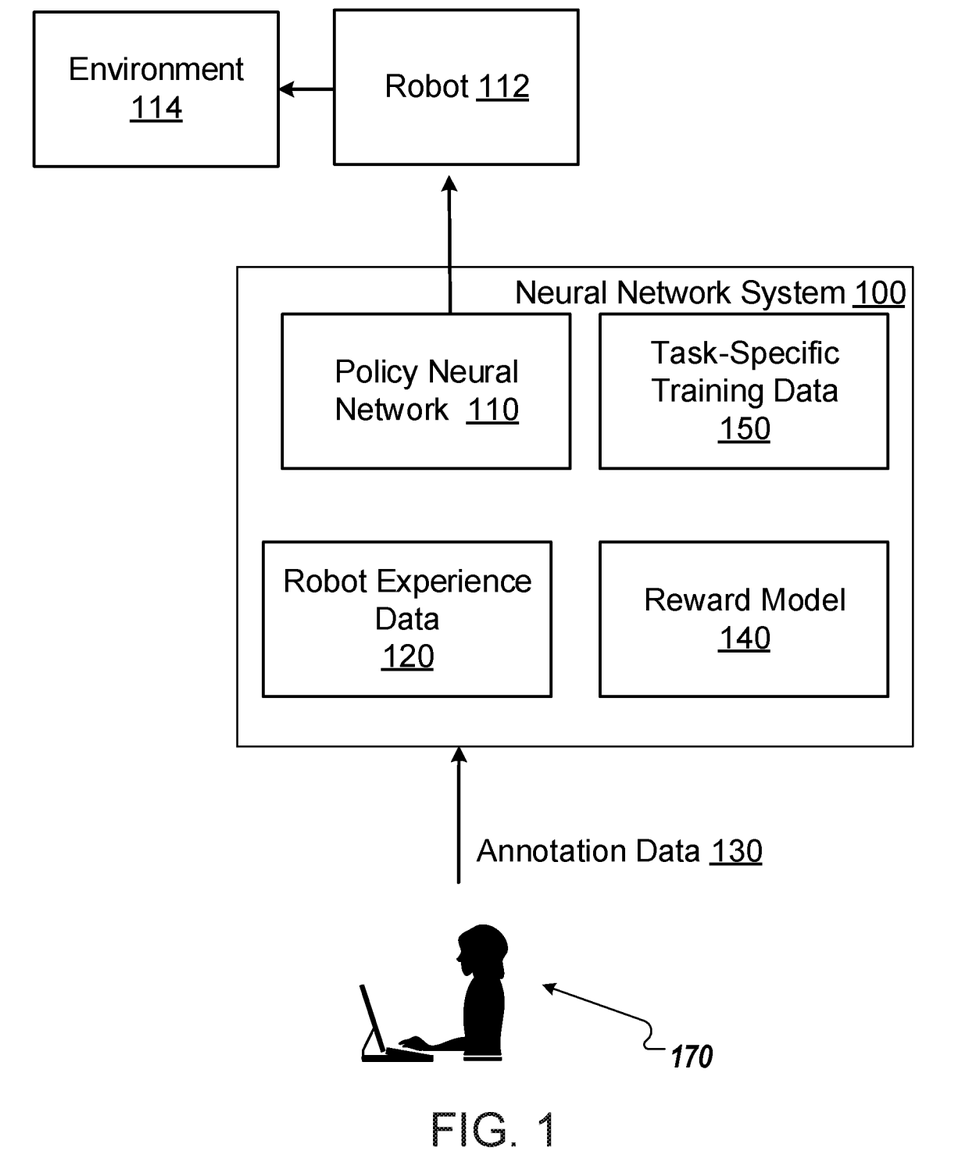
FIG. 1 shows an example neural network training system.

FIG. 1 shows an example neural network training system 100. The system 100 is an example of a system implemented as computer programs on one or more computers in one or more locations, in which the systems, components, and techniques described below can be implemented.

The system 100 trains a policy neural network 110 that is used to control a robot 112, i.e., to select actions to be performed by the robot while the robot 112 is interacting with an environment 114, in order to cause the robot 112 to perform a particular task. The robot may be e.g. an industrial robot, or a warehouse robot, or an autonomous or semi-autonomous vehicle. The environment may be a real world environment.

For example, the particular task can include causing the robot 112 to navigate to different locations in the environment, causing the robot 112 to locate different objects, causing the robot 112 to pick up or manipulate different objects or to move different objects to one or more specified locations, and so on.

Each input to the policy neural network 110 can include an observation characterizing the state of the environment being interacted with by the agent i.e. robot, and the output of the policy neural network ("policy output") can define an action to be performed by the agent in response to the observation, e.g., an output that defines a probability distribution over possible actions to be performed by the agent, or that defines an action deterministically.

The observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In other words, the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment.

In one example, the observations each include one or more images of an environment captured by one or more cameras, e.g., a camera sensor of a robot, one or more cameras located at different locations in the environment external from the robot, or both, and lower-dimensional proprioceptive features of the robot.

As a particular example, each input to the policy neural network 110 can include an action and an observation and the output of the policy neural network 110 can be a Q value that represents a predicted return that would be received by the robot as a result of performing the action in response to the observation.

A return refers to a cumulative measure of rewards received by the agent 112, for example, a time-discounted sum of rewards. Generally, a reward is a scalar numerical value and characterizes, e.g., a progress of the agent towards completing a task.

As a particular example, the reward can be a sparse binary reward that is zero unless the task is successfully completed and one if the task is successfully completed as a result of the action performed.

As another particular example, the reward can be a dense reward that measures a progress of the robot towards completing the task as of individual observations received during an episode of attempting to perform the task. That is, individual observations can be associated with non-zero reward values that indicate the progress of the robot towards completing the task when the environment is in the state characterized by the observation. The system 100 can then control the robot 112 based on the Q values for the actions in the set of actions, e.g., by selecting, as the action to be performed by the robot 112, the action with the highest Q value.

As another particular example, each input to the policy neural network 110 can be an observation and the output of the policy neural network 110 can be a probability distribution over the set of actions, with the probability for each action representing the likelihood that performing the action in response to the observation will maximize the predicted return. The system 100 can then control the robot 112 based on the probabilities, e.g., by selecting, as the action to be performed by the robot 112, the action with the highest probability or by sampling an action from the probability distribution.

In some cases, in order to allow for fine-grained control of the agent, the system 100 can treat the space of actions to be performed by the robot, i.e., the set of possible control inputs, as a continuous space. Such settings are referred to as continuous control settings. In these cases, the output of the policy neural network 110 can be the parameters of a multi-variate probability distribution over the space, e.g., the means and covariances of a multi-variate Normal distribution, or can directly define an action.

In some cases, e.g. in an actor-critic type system, during training the system 100 may make use of a critic neural network that optionally shares some parameters with the policy neural network 110 and outputs a Q-value as previously described or parameters of one or more Q-value distributions for a distributional critic e.g. based on an observation-action input. For example the system 100 may implement a distributional Deep Deterministic Policy Gradient reinforcement learning system (arXiv: 1804.08617).

The policy neural network 110 can have any appropriate architecture that allows the policy neural network 110 to process an observation to generate a policy output.

As a particular example, when the observations include high-dimensional sensor data, e.g., images or laser data, the policy neural network 110 can be a convolutional neural network. As another example, when the observations include only relatively lower-dimensional inputs, e.g., sensor readings that characterize the current state of the robot, the policy neural network can be a multi-layer perceptron. As yet another example, when the observations include both high-dimensional sensor data and lower-dimensional inputs, the policy neural network 110 can include a convolutional encoder that encodes the high-dimensional data, a fully-connected encoder that encodes the lower-dimensional data, and a policy subnetwork that operates on a combination, e.g., a concatenation, of the encoded data to generate the policy output.

For example in one particular implementation the policy neural network 110 includes a convolutional neural network followed by a spatial softmax layer that encodes images into a set of keypoint coordinates to which are appended proprioceptive features. The policy neural network 110 can then embed the resulting features with a linear layer and apply layer normalization to generate final features. The policy neural network 110 then processes the final features using a policy head, implemented as a recurrent neural network, to generate a probability distribution or parameters of a probability distribution. A critic neural network, also implemented as a recurrent neural network can also process the final features to generate a Q-value output.

To allow the system 100 to train the neural network 110, the system 100 maintains robot experience data 120. Generally, the robot experience data 120 is data that characterizes robot interactions with the environment 114.

The robot experience data 120 includes experiences 122 that, in turn, each include an observation and an action performed by a robot in response to the observation.

This robot experience data 120 can include a large amount of experiences 122 collected while one or more robots perform various different tasks or randomly interact with the environment. However, the robot experience data 120 is generally not associated with rewards for the particular task, which are required to train the policy neural network 110 through reinforcement learning. That is, although task-specific rewards for the particular task are required in order to train the policy neural network 110 to control the robot 112 to perform the particular task, no such rewards are available in the robot experience data 120.

More specifically, the robot experience data 120 will generally include a small amount of demonstration data of the particular task being performed by a robot. However, this demonstration data is not associated with any task-specific rewards for the particular task. Generating this demonstration data is described below with reference to FIG. 2.

Moreover, the robot experience data 120 will generally additional include a large number of experience data that was collected while one or more robots were performing different tasks or randomly interacting with the environment. As a particular example, the robot experience data 120 can include data collected from interactions of a plurality of robots while performing a plurality of different tasks. For example, the system 100 may have previously trained one or more other policy neural networks to control robots to perform other tasks, and the robot experience data 120 can include any data collected as a result of the previous training. Thus, the majority of the data in the experience data 120 will generally be data that was collected while a robot was performing a task that is different from the particular task (or randomly interacting with the environment).

Thus, although a large amount of data 120 may be available to the system 100, the system 100 cannot directly use the data 120 to train the policy neural network 110.

To allow the system 100 to train the policy neural network 110 using the data 120, the system 100 obtains annotation data 130 that assigns, to each experience in a first subset of the experiences 122 in the robot experience data 120, a respective task-specific reward for the particular task.

In particular, the system 100 obtains annotations for the demonstration data, i.e., for one or more episodes of a robot successfully performing the particular task and, optionally, one or more episodes of a robot unsuccessfully performing the particular task. Further optionally, the system can also obtain annotation data for experiences where the robot was not attempting to perform the particular task, e.g., where the robot is performing a different task or interacting randomly with the environment.

As a particular example, the system 100 can obtain the annotation data through interaction with a set of human users 170. For example, to obtain rewards for experiences in an episode of a robot performing a task, the system 100 can provide a user interface that can be presented to a human user 170 on a user device that allows the human user to view an episode of a robot performing the task and to provide, through the user interface and to the system 100, an indication of how successfully the robot performed the particular task. The system 100 can then generate a task-specific reward identifying the reward.

Obtaining the annotation data is described in more detail below with reference to FIGS. 2 and 3.

The system 100 trains, on the annotation data 130, a reward model 140 that receives as input an input observation and generates as output a reward prediction that is a prediction of a task-specific reward for the particular task that should be assigned to the input observation. In some implementations, the reward model is a reward ranking model (or more simply ranking model). That is, the model is trained to rank rewards within a task episode (an instance of controlling the robot to perform a task) rather than regressing to the task-specific rewards in the annotation data.

Thus, after training, the trained reward model 140 can predict task-specific rewards for observations even if those observations were not generated while a robot was performing the particular task.

The reward model 140 can have any appropriate architecture that allows the model 140 to process an observation to generate a reward prediction. In particular, the reward model 140 can have a similar architecture as the policy neural network 110, but with a different output layer that allows reward model 140 to generate an output that is a single value rather than a potentially multi-valued policy output.

The system 100 generates task-specific training data 150 for the particular task that associates each of a plurality of experiences with a task-specific reward for the particular task.

In particular, for each experience in a second subset of the experiences in the robot experience data, the system 100 processes the observation in the experience using the trained reward model 140 to generate a reward prediction, and associates the reward prediction with the experience.

The system can generate a set of training data 150 that includes the second subset of experiences associated with the reward predictions and, optionally, the first subset of experience and the associated rewards obtained through the annotation data 130.

In some cases, the second subset of the experience is disjoint from the first subset, i.e., includes only the experiences in the data 120 that were not annotated with rewards by the annotation data 130. In some other cases, the second subset includes some or all of the data in the first subset, e.g., because the rewards predicted by the trained reward model 140 are likely to be a more accurate reward for the particular task than an annotation provided by a single human user.

By generating training data 150 in this way, the system 100 can generate a large amount of training data for the particular task from only a small amount of labeled experiences. Including in the second subset a mix of experience specific to the particular task and other experience, drawn from the NES, can improve the final performance of the trained policy neural network.

The system 100 then trains the policy neural network 110 on the task-specific training data 150 for the particular task, e.g., using off-policy reinforcement learning (i.e. the experience is generated using a separate policy to a current policy of the policy neural network). In implementations this training is done entirely off-policy. The system can train the policy neural network 110 on a large amount of data with minimal additional robot environment interaction, i.e., minimal environment interaction in addition to the interactions that were already reflected in the robot experience data 120.

The operation of the system 100 to train the policy neural network 110 starting from the robot experience data 120, i.e., starting from data without any task-specific rewards for the particular task, is described in more detail below with reference to FIGS. 2 and 3.

After the system 100 has trained the policy neural network 110, the system 100 can control the robot 112 while the robot 112 performs the particular task using the trained policy neural network 110.

Alternatively or in addition, the system can provide data specifying the trained policy neural network 110, i.e., the trained values of the parameters of the neural network, for use in controlling a robot while the robot performs the particular task.

In either of these cases, the system 100 can then obtain experiences generated as a result of controlling a robot using the trained policy neural network 110 to perform the particular task and add the experiences to the robot experience data 120. In this way, the experiences become available for use in training another neural network to control a robot to perform another task. Thus, the amount of experiences in the robot experience data 120 can continue to increase and continue to be re-purposed by the system 100 for learning new tasks, even though none of the experience data 120 may be associated with task rewards for the new tasks or was generated while a robot was performing the new task.

Optionally more annotation data can be obtained for the new experience data, and the training process can be iterated to further train the policy neural network.

Figure 2:
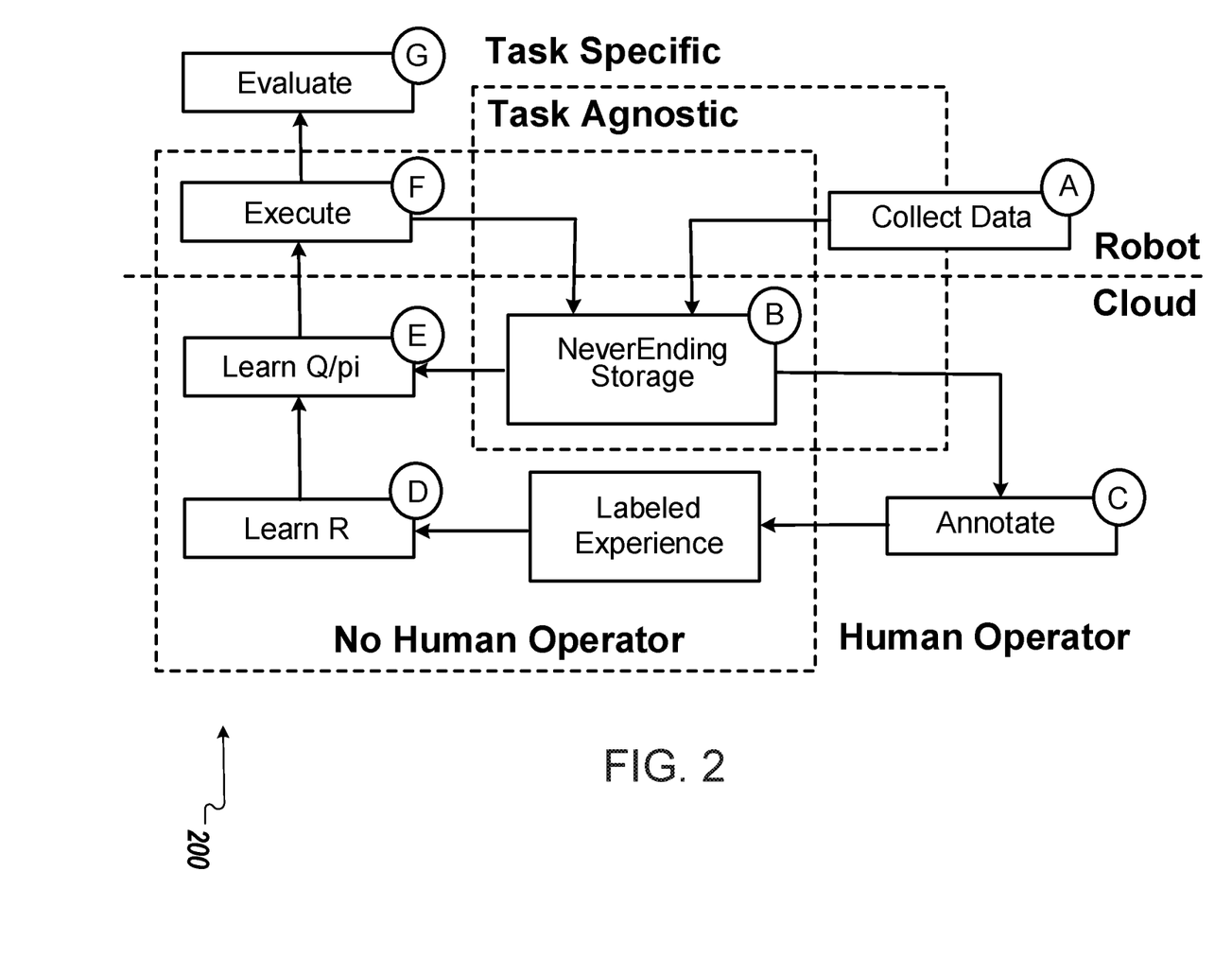
FIG. 2 is a diagram of the operation of the neural network training system.

FIG. 2 is a diagram 200 of the phases of training the policy neural network 110.

In the diagram 200, the phases of the training are divided into those phases that require controlling a robot (the phases A, F, and G that are depicted above the dotted line that divides the diagram into "Robot" and "Cloud") and those phases that can be performed without controlling a robot, e.g., in the cloud or on a different system of computers (the phases B, C, D, and E that are depicted below the dotted line that divides the diagram into "Robot" and "Cloud").

The phases of the training are also divided into those phases that are specific to the particular task for which the policy neural network 110 is being trained (phases C-G and part of phase A in the "Task Specific" area outside the "Task Agnostic" box) and those phases that are agnostic to the task for which the policy neural network is being trained, i.e., that can be performed without knowledge of the particular task (phase B and optionally part of phase A inside the "Task Agnostic" box).

Additionally, the phases are divided into those phases that require user involvement (phases A and C in the "Human Operator" area outside of the "No Human Operator" box) and those phases that are agnostic to the task for which the policy neural network is being trained, i.e., that can be performed without knowledge of the particular task (phases B and D-G in the "No Human Operator" box).

In phase A, the system collects demonstration data of the robot performing the particular task. As shown in the example of FIG. 2, the collection of the demonstration data involves a "human operator," e.g., a user who tele-operates a robot to perform the particular task. For example, the system 100 can allow a user to control the robot by submitting control inputs to the robot over a network connection while viewing a video of the environment, e.g., from the perspective of the robot or from a third-person view relative to the robot, transmitted over the network connection and can record the control inputs, i.e., actions, and observations corresponding to different frames in the video to generate the demonstration data.

However, in other examples, the system can collect the demonstration data without a human operator, e.g., by controlling the robot using a simpler control policy, e.g., a hard-coded, rule-based policy.

Additionally, in phase A, the system can optionally also collect data of a robot randomly interacting with the environment or exploring the environment according to some exploration policy, i.e., task-agnostic data.

In phase B, the system stores the demonstration data in NeverEnding Storage (NES), i.e., in one or more physical or logical data storage devices that store the collected robot experience data 120 of FIG. 1. As described above with reference to FIG. 1, the robot experience data stored in the NeverEnding Storage may include experiences collected while different robots perform different tasks, i.e., tasks different than the particular task. The storage is referred to as "NeverEnding" because experiences generated as a result of training a neural network for one task can be continuously repurposed for use in training neural networks for new tasks using the described techniques. Nonetheless in practice once the policy neural network is satisfactorily trained experience gathering may be halted.

In phase C, the system obtains annotation data, e.g., that is generated by a user ("human operator") submitting annotation inputs to the system. The annotation data includes annotations that define task-specific rewards for the demonstration data and, optionally, other experience data in the NeverEnding storage. Obtaining the annotation data will be described in more detail below with reference to FIG. 3.

In phase D, the system learns, i.e., trains, a reward model R on the annotation data. As described above, the reward model maps received observations to predicted task-specific rewards for the particular tasks. Thus, after training, the reward model can be used to predict task-specific rewards even for experiences that were not collected while the robot was performing the particular task.

Training the reward model will be described in more detail below with reference to FIG. 3.

In phase E, the system learns a policy ("Q/pi") for controlling the agent. In particular, as described above and in more detail below with reference to FIG. 3, the system generates task-specific training data using the trained reward model and then trains the policy neural network on the task-specific training data. The system can then use the policy defined by the outputs of the trained policy neural network as a final policy for controlling the agent.

Optionally, the system can then perform phases F and G.

In phase F, the system executes episodes of the particular task, i.e., controls a robot using the learned policy, i.e., using the trained policy neural network, to perform the particular task. For example, the system can cause the robot to perform a specified number of task episodes while controlling the robot using the trained policy neural network, i.e., causing the robot to perform actions defined by the outputs of the trained policy neural network.

Then, in phase G, the system evaluates the performance of the learned policy, i.e., of the trained policy neural network, e.g., to determine whether the learned policy is of sufficiently high quality for deployment in a production setting. As one example, the system can evaluate the policy neural network based on the proportion of task episodes that are performed successfully, the average reward obtained per task episode, or whether any of the task episodes resulted in undesirable wear and tear on the robot or damage to other objects in the environment.

The system can then add the experience data generated as resulting of performing phase F to the NeverEnding Storage, i.e., for use in training new policy neural networks for new tasks. If the system determines that the learned policy is of sufficiently high quality for deployment, the system can also add experiences generated after the policy has been deployed to the NeverEnding Storage if the system has access to such experiences.

Thus, the NeverEnding Storage can continue to grow as more policy neural networks are trained for more new tasks.

Figure 3:
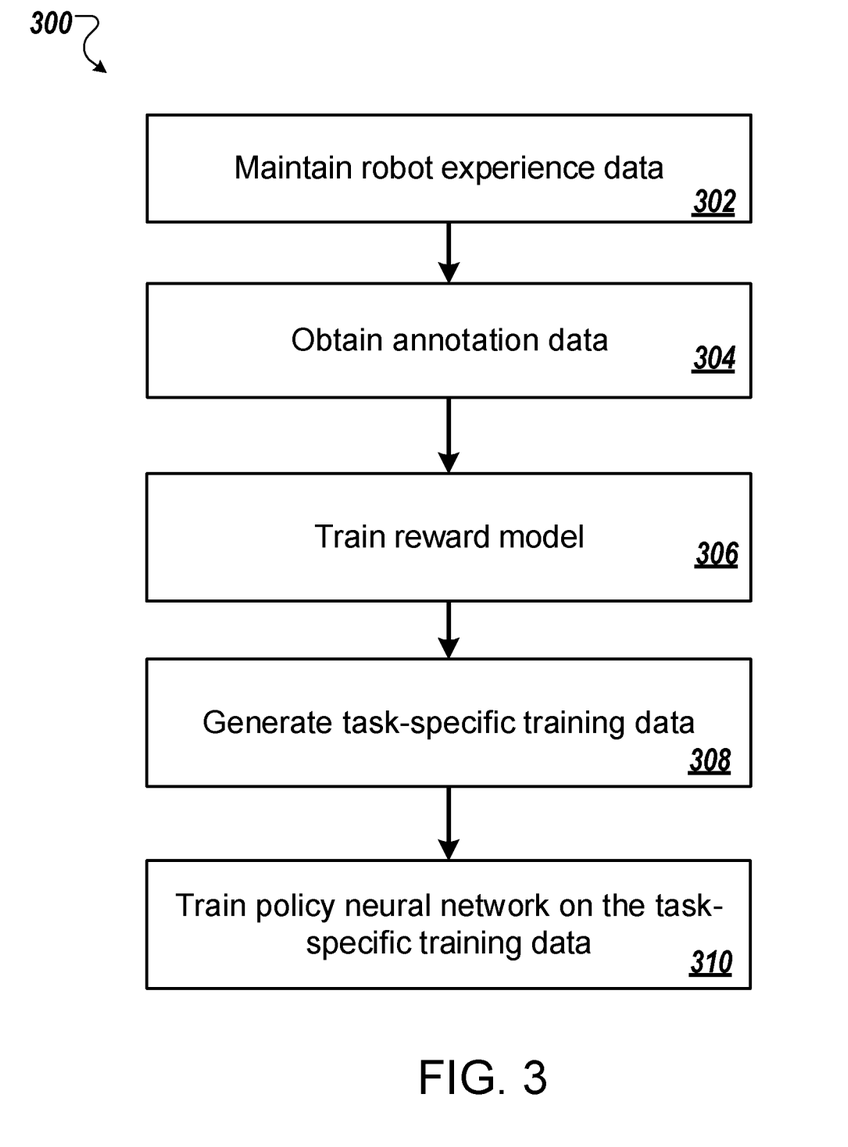
FIG. 3 is a flow diagram of an example process for training a policy neural network.

FIG. 3 is a flow diagram of an example process 300 for training a policy neural network. For convenience, the process 300 will be described as being performed by a system of one or more computers located in one or more locations. For example, a neural network training system, e.g., the neural network training system 100 of FIG. 1, appropriately programmed, can perform the process 300.

The system maintains robot experience data characterizing robot interactions with an environment (step 302). In particular, the data includes experiences that each, in turn, include an observation and an action performed by a respective robot in response to the observation.

The system obtains annotation data that assigns, to each experience in a first subset of the experiences in the robot experience data, a respective task-specific reward for a particular task (step 304).

Generally, the first subset of experiences in the robot experience data include demonstration experiences collected as a robot performs one or more episodes of the particular task.

For example, the first subset of experiences can include experiences that have been collected while the robot was controlled by a user, e.g., tele-operated, while performing the one or more episodes. Alternatively or in addition, the first subset of experiences can include experiences that have been collected while the robot was controlled by a different computer system using a different policy, e.g., a hard-coded rule-based policy or a simpler machine-learned policy.

In some implementations, the first subset of experience can also include experiences collected as the robot performs tasks that are different from the particular task, or interacts randomly with the environment. That is, the system can obtain annotation data that assigns task-specific rewards for the particular task to experiences collected while a robot was performing a different task. This can ensure that the annotation data has better coverage of the state space of all possible states of the environment.

To obtain the annotation data, the system can receive annotation inputs from one or more users that define rewards for each of the experiences in the first subset.

To obtain a given annotation input, the system can provide, for presentation to a user in user interface presented on a user device, a representation of one or more of the experiences in the first subset of experience data and then obtain, from the user, inputs submitted through the user device defining the rewards for the one or more experiences.

As a particular example, when the reward is a sparse reward, the system can provide for presentation a video of a robot performing an episode of the task. The user can then submit an input indicating whether the task was performed successfully or not, and the system can map the input to a reward value of 1 for the last experience in the episode if the task was performed successfully and a reward value of 0 for the last experience in the episode if the task was not performed successfully.

As another particular example, when the reward is a dense reward, the system can provide for presentation a video of a robot performing an episode of the task and the user can submit inputs that associate individual frames of the video, i.e., individual experiences within the episode, with a measure of progress of the agent towards completing the task as of the frame. The system can then map these inputs to dense reward values.

For example, the system can present a user interface that allows the user to draw a curve indicating the progress towards accomplishing the particular task as a function of time, while the interface shows the frame corresponding to the current cursor position. The system can then map the curve drawn by the user to a curve of numeric reward values that are appropriately scaled to obtain the task-specific rewards for the experiences in the episode. Allowing the user to submit annotation inputs by drawing a curve while viewing a video can allow the user to accurately capture the progress of the robot without having to individually label each frame in the video with a reward value.

Figure 4:
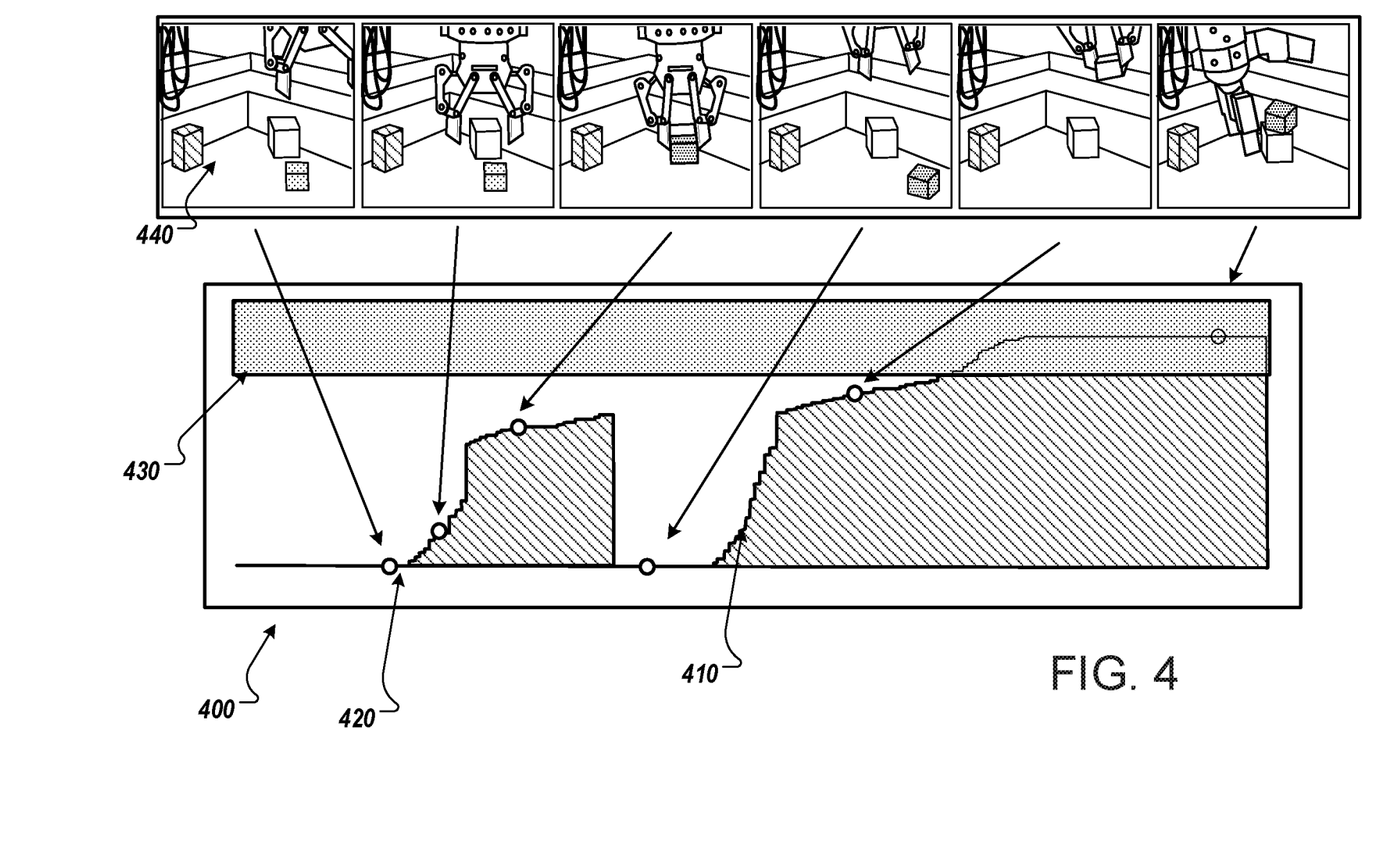
FIG. 4 shows an example user interface through which a user annotates a task episode.

FIG. 4 shows an example user interface 400 through which a user annotates a task episode.

As seen in the example of FIG. 4, the user has drawn, e.g. using an input device or by submitting a touch input, a reward curve 410 that indicates the progress of the robot in completing the task at any given time in the episode while viewing a video of the episodes. In the example of FIG. 4, the dotted portion 430 at the top of the interface 400 indicates that the robot has successfully performed the task. As shown in FIG. 4, the dots illustrate the video frame that was being shown to the user at given points along the reward curve 410. For example, the dot 420 is at a time in the episode where the user indicated that the robot was very far from completing the task while viewing a frame 440, i.e., the point on the curve is very far from the success region 430. The frame 440 shown to the user at that time corresponding to the dot 420 indicates that the robot had not yet interacted with any of the objects in the environment. Thus, by interacting with the interface 400 to draw the reward curve 410, a user can easily annotate all of the observations in the episode with a reward without explicitly assigning a numerical reward value to the observations.

Returning to the description of FIG. 3, the system trains, on the annotation data, a reward model that receives as input an input observation and generates as output a reward prediction that is a prediction of a task-specific reward for the particular task that should be assigned to the input observation (step 306).

Generally, the system trains the reward model using an intra-episode approach rather than training the model to regress the task-specific rewards directly. This can be beneficial when multiple users are submitting the annotation data, because while there may be high agreement between annotators on the relative quality of experiences within an episode (in terms of value towards completing the particular task), annotators are often not consistent in the overall scale of the task-specific rewards.

As a specific examples, given two experiences in the same episode, the system trains the reward model so that the reward predictions for the two experiences satisfy two conditions.

First, if the first experience is successful according to the task-specific reward it should be successful according the estimated reward generated by the reward model and if the first experience is unsuccessful according to the task-specific reward it should be unsuccessful according the estimated reward generated by the reward model. The system can determine that an experience is successful according to the task-specific reward when the task-specific reward for the experience is above an annotation success threshold value and determine that the experience is unsuccessful according to the task-specific reward when the task-specific reward for the experience is below an annotation failure threshold value. Similarly, the system can determine that an experience is successful according to the reward predictions when the reward prediction for the experience is above an prediction success threshold value and determine that the experience is unsuccessful according to the reward prediction when the reward prediction for the experience is below a prediction failure threshold value. The threshold values are hyperparameters of the training of the reward prediction model.

Second, if the task-specific reward for the first experience is higher than the task-specific reward for the second experience by a first threshold, then the predicted reward for the first experience should be higher than the predicted reward for the second experience by a second threshold, where the first and second threshold are hyperparameters of the training of the reward prediction model.

In particular, to satisfy these conditions, the system trains the reward model to optimize a so-called hinge loss function, that measures differences in reward predictions between different experiences from a same task episode. In other words, the reward model can be seen as a (reward) ranking model that ranks rewards within the same task episode.

More specifically, the hinge loss function can be a sum or a weighted sum of two components.

The first component trains the model to generate reward predictions that satisfy the second condition and can, for a given pair of experiences from the same episode, be equal to zero if the task-specific reward for the first experience is not higher than the task-specific reward for the second experience by the first threshold and, if the task-specific reward for the first experience is higher than the task-specific reward for the second experience by the first threshold, be equal to the maximum of (i) zero or (ii) the difference between the predicted reward for the first experience and the predicted reward for the second experience plus the second threshold.

The second component trains the model to generate reward predictions that satisfy the first condition and can include two terms.

The first term can, for a given experience, be equal to zero if the experience is not successful according to the task-specific rewards and, if the experience is successful according to the task-specific rewards, be equal to the maximum of (i) zero or (ii) the difference between the prediction success threshold value and the predicted reward for the experience.

The second term can, for a given experience, be equal to zero if the experience is not unsuccessful according to the task-specific rewards and, if the experience is unsuccessful according to the task-specific rewards, be equal to the maximum of (i) zero or (ii) the difference between the predicted reward for the experience and the prediction failure threshold value.

The system can train the reward model to minimize this loss function using supervised learning.

The system generates task-specific training data for the particular task that associates each of a plurality of experiences with a task-specific reward for the particular task using the trained reward model (step 308).

In particular, the system can select a second subset of experiences from the robot experience data and, for each experience in the second subset, process the observation in the experience using the trained reward model to generate a reward prediction and associate the reward prediction with the experience. This results in a labeled experience that is associated with a task-specific reward, i.e., the reward prediction that was generated by the trained reward model. Thus the system can use a relatively small amount of annotation data e.g. from human demonstrations, to generate hundreds of hours of useful training data.

The system then trains the policy neural network on the task-specific training data for the particular task (step 310).

For example, the system can train the policy neural network on the particular task using an off-policy reinforcement learning technique. Because the technique is "off-policy," i.e., does not require that any experience on which the neural network is being trained be generated using the current version of the neural network, the system can train the policy neural network on the task-specific training data without needing to control the robot using the neural network to perform the particular task.

The system can use any appropriate off-policy reinforcement learning technique for training the policy neural network. As a particular example, the system can use a batch reinforcement learning technique, for example, one that relies on distributional policy gradients to update the policy neural network or one that relies on non-distributional deterministic policy gradients to update the policy neural network. Batch reinforcement learning is described in more detail in Sascha Lange, Thomas Gabel, and Martin Riedmiller. Batch reinforcement learning. In Reinforcement learning, pages 45-73. Springer, 2012. Distributional policy gradients and non-distributional deterministic policy gradients are described in more detail in Gabriel Barth-Maron, Matthew W. Hoffman, David Budden, Will Dabney, Dan Horgan, Dhruva TB, Alistair Muldal, Nicolas Heess, and Timothy Lillicrap. Distributed distributional deterministic policy gradients. In International Conference on Learning Representations, 2018.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   maintaining robot experience data characterizing robot interactions with an environment, the robot experience data comprising a plurality of experiences that each comprise an observation and an action performed by a respective robot in response to the observation;
   obtaining annotation data that assigns, to each experience in a first subset of the experiences in the robot experience data, a respective task-specific reward for a particular task, wherein the first subset of experiences comprises experiences from a plurality of different task episodes of the particular task;
   training, on the annotation data, a reward model that receives as input an input observation and generates as output a reward prediction that is a prediction of a task-specific reward for the particular task that should be assigned to the input observation, wherein training the reward model comprises training the reward model to optimize a loss function that includes a term that measures, for a given pair of experiences from a same task episode of the plurality of different task episodes, (i) a difference in a respective reward prediction generated by the reward model for a first observation in a first experience in the given pair and a respective reward prediction generated by the reward model for a second observation in a second experience in the given pair and (ii) a difference in a respective task-specific reward for the first experience in the given pair and a respective task-specific reward for the second experience in the given pair;
   generating task-specific training data for the particular task that associates each of a plurality of experiences with a task-specific reward for the particular task, comprising, for each experience in a second subset of the experiences in the robot experience data:
      processing the observation in the experience using the trained reward model to generate a reward prediction, and
      associating the reward prediction with the experience; and
   training a policy neural network on the task-specific training data for the particular task, wherein the policy neural network is configured to receive a network input comprising an observation and to generate a policy output that defines a control policy for a robot performing the particular task.

2. The method of claim 1, further comprising:
   controlling a robot while the robot performs the particular task using the trained policy neural network.

3. The method of claim 2, further comprising:
   obtaining experiences generated as a result of controlling the robot using the policy neural network to perform the particular task; and
   adding the experiences to the robot experience data.

4. The method of claim 1, further comprising:
   providing data specifying the trained policy neural network for use in controlling a robot while the robot performs the particular task.

5. The method of claim 1, wherein the robot experience data comprises data collected from interactions of a plurality of robots while performing a plurality of different tasks.

6. The method of claim 5, wherein the second subset of experience data was collected as a result of a robot performing one or more tasks that are different from the particular task.

7. The method of claim 1, wherein the experiences in the robot experience data are not associated with any rewards for any of the plurality of different tasks.

8. The method of claim 1, wherein training the policy neural network comprising training the policy neural network using an off-policy reinforcement learning technique.

9. The method of claim 1, wherein the first subset of experience data comprises demonstration experiences collected as a robot performs one or more episodes of the particular task.

10. The method of claim 9, wherein the robot is controlled by a user while performing the one or more episodes of the particular task.

11. The method of claim 1, wherein obtaining annotation data comprises:
    providing, for presentation to a user, a representation of one or more of the experiences in the first subset of experience data; and
    obtaining, from the user, inputs defining the rewards for the one or more experiences.

12. The method of claim 1, wherein the loss function includes another term that measures, for a given experience that is successful according to the respective task-specific reward for the experience, a difference between a prediction success threshold value and a respective predicted reward generated by a reward model for a given observation in the given experience.

13. A system comprising one or more computers and one or more storage devices storing instructions that, when executed by the one or more computers, cause the one or more computers to perform operations comprising:
    maintaining robot experience data characterizing robot interactions with an environment, the robot experience data comprising a plurality of experiences that each comprise an observation and an action performed by a respective robot in response to the observation;
    obtaining annotation data that assigns, to each experience in a first subset of the experiences in the robot experience data, a respective task-specific reward for a particular task, wherein the first subset of experiences comprises experiences from a plurality of different task episodes of the particular task;
    training, on the annotation data, a reward model that receives as input an input observation and generates as output a reward prediction that is a prediction of a task-specific reward for the particular task that should be assigned to the input observation, wherein training the reward model comprises training the reward model to optimize a loss function that includes a term that measures, for a given pair of experiences from a same task episode of the plurality of different task episodes, (i) a difference in a respective reward prediction generated by the reward model for a first observation in a first experience in the given pair and a respective reward prediction generated by the reward model for a second observation in a second experience in the given pair and (ii) a difference in a respective task-specific reward for the first experience in the given pair and a respective task-specific reward for the second experience in the given pair;

generating task-specific training data for the particular task that associates each of a plurality of experiences with a task-specific reward for the particular task, comprising, for each experience in a second subset of the experiences in the robot experience data:
processing the observation in the experience using the trained reward model to generate a reward prediction, and
associating the reward prediction with the experience; and training a policy neural network on the task-specific training data for the particular task, wherein the policy neural network is configured to receive a network input comprising an observation and to generate a policy output that defines a control policy for a robot performing the particular task.

14. The system of claim 13, the operations further comprising:
controlling a robot while the robot performs the particular task using the trained policy neural network.

15. The system of claim 14, the operations further comprising:
obtaining experiences generated as a result of controlling the robot using the policy neural network to perform the particular task; and
adding the experiences to the robot experience data.

16. The system of claim 13, the operations further comprising:
providing data specifying the trained policy neural network for use in controlling a robot while the robot performs the particular task.

17. The system of claim 13, wherein the robot experience data comprises data collected from interactions of a plurality of robots while performing a plurality of different tasks.

18. The system of claim 17, wherein the second subset of experience data was collected as a result of a robot performing one or more tasks that are different from the particular task.

19. The system of claim 13, wherein the first subset of experience data comprises demonstration experiences collected as a robot performs one or more episodes of the particular task.

20. One or more non-transitory computer-readable storage media encoded with instructions that, when executed by one or more computers, cause the one or more computers to perform operations comprising:
maintaining robot experience data characterizing robot interactions with an environment, the robot experience data comprising a plurality of experiences that each comprise an observation and an action performed by a respective robot in response to the observation;
obtaining annotation data that assigns, to each experience in a first subset of the experiences in the robot experience data, a respective task-specific reward for a particular task, wherein the first subset of experiences comprises experiences from a plurality of different task episodes of the particular task;
training, on the annotation data, a reward model that receives as input an input observation and generates as output a reward prediction that is a prediction of a task-specific reward for the particular task that should be assigned to the input observation, wherein training the reward model comprises training the reward model to optimize a loss function that includes a term that measures, for a given pair of experiences from a same task episode of the plurality of different task episodes, (i) a difference in a respective reward prediction generated by the reward model for a first observation in a first experience in the given pair and a respective reward prediction generated by the reward model for a second observation in a second experience in the given pair and (ii) a difference in a respective task-specific reward for the first experience in the given pair and a respective task-specific reward for the second experience in the given pair;
generating task-specific training data for the particular task that associates each of a plurality of experiences with a task-specific reward for the particular task, comprising, for each experience in a second subset of the experiences in the robot experience data:
processing the observation in the experience using the trained reward model to generate a reward prediction, and
associating the reward prediction with the experience; and
training a policy neural network on the task-specific training data for the particular task, wherein the policy neural network is configured to receive a network input comprising an observation and to generate a policy output that defines a control policy for a robot performing the particular task.

* * * * *

UNITED STATES PATENT AND TRADEMARK OFFICE
CERTIFICATE OF CORRECTION

| | | |
|---|---|---|
| PATENT NO. | : 11,712,799 B2 | Page 1 of 1 |
| APPLICATION NO. | : 17/020294 | |
| DATED | : August 1, 2023 | |
| INVENTOR(S) | : Cabi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 231 days.

Signed and Sealed this
Twelfth Day of November, 2024

*Katherine Kelly Vidal*

Katherine Kelly Vidal
*Director of the United States Patent and Trademark Office*